J. S. JOHNSON.
CULINARY DEVICE.
APPLICATION FILED APR. 25, 1911.
1,014,479.
Patented Jan. 9, 1912.
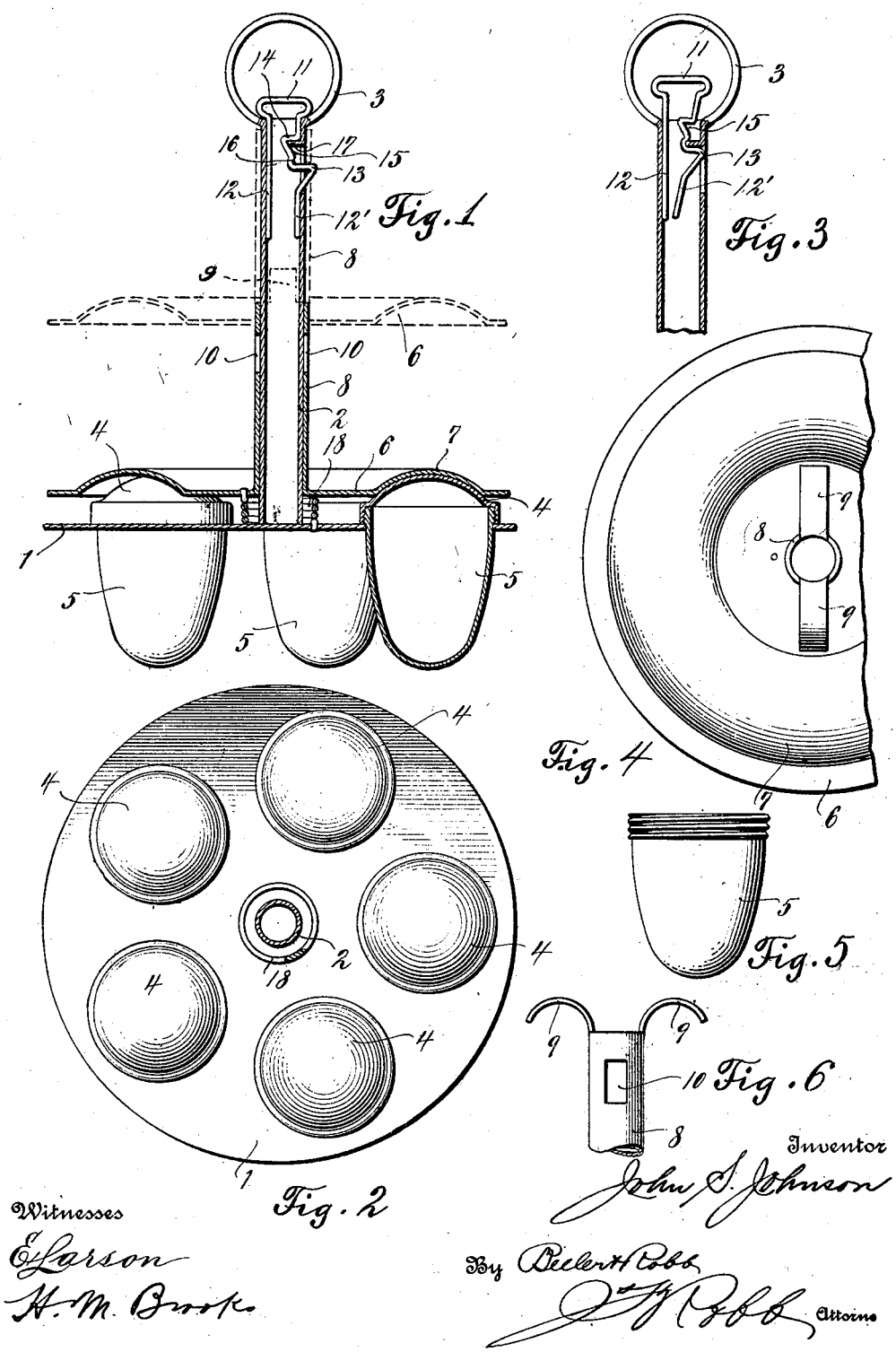

UNITED STATES PATENT OFFICE.

JOHN S. JOHNSON, OF FAYETTE, MICHIGAN.

CULINARY DEVICE.

1,014,479.  Specification of Letters Patent.  Patented Jan. 9, 1912.

Application filed April 25, 1911. Serial No. 623,217.

*To all whom it may concern:*

Be it known that I, JOHN S. JOHNSON, a subject of Norway, residing at Fayette, in the county of Delta and State of Michigan, have invented certain new and useful Improvements in Culinary Devices, of which the following is a specification.

This invention embodies an improved culinary device of the type designed particularly for boiling eggs or food and embodying a tray to support the articles of food in a cooking vessel, a handle for readily removing the tray and its contents, and means for positively holding eggs or small receptacles adapted to contain food upon the tray.

The invention resides particularly in the special means employed for maintaining the clamping member which coöperates with the tray in an inoperative position.

For a full understanding of the present invention, reference is to be had to the following description and to the accompanying drawings, in which—

Figure 1 is a vertical sectional view of a device embodying the invention; Fig. 2 is a horizontal section showing more particularly the tray and receptacles supported thereon in top plan view; Fig. 3 is a fragmentary sectional view of the tubular extension of the tray, showing a different adjustment of the catch from that illustrated in Fig. 1; Fig. 4 is a fragmentary plan view of the clamping plate; Fig. 5 is a detail view of one of the food receptacles, the cover removed; Fig. 6 is a view in elevation of the upper portion of the tubular extension of the clamping plate.

Throughout the following detail description and on the several figures of the drawings, similar parts are referred to by like reference characters.

In the drawings, 1 denotes a tray provided with a plurality of openings adapted to receive eggs or receptacles 5 which latter may contain any articles of food to be cooked. The tray 1 has a central tubular extension 2 formed at its upper end with a handle 3. The receptacles 5 are provided with covers or screw tops 4, the diameters of which are slightly greater than the diameters of the openings in the tray 1 so that the outer peripheral portion of each cover forms a stop to engage the top of the tray in supporting each receptacle thereon.

A clamping plate 6 of a diameter approximating that of the tray 1 is arranged so as to move upwardly and downwardly above the tray and has seats or pockets 7 to receive and conform with the shape of eggs, as well as the shape of the covers 4 of the receptacles 5. A tubular extension 8 projects upwardly from the central portion of the clamping plate 6 and is concentric with the tubular member 2 of the tray 1 in that it surrounds the latter. At the upper extremity of the tubular extension 8 are the lateral finger pieces 9 designed to be readily grasped so as to raise the clamping member 6 sufficiently to permit of readily placing in position the receptacles 5, eggs, or the like. Also formed near the upper extremity of the member 8 are the openings 10 which coöperate with a special form of catch 11 mounted in the upper end of the tubular member 2. The catch 11 comprises a gripping portion, a pair of legs 12 and 12′ movable within the member 2, and a hook 13 carried by the leg 12′ and movable through an opening in the upper end of the member 2 so as to engage in an opening 10 of the extension 8. The leg 12′ aforesaid also has an inwardly extending projection 14 provided with a cam portion 15 both coöperating with a lug 17 bent inwardly from the upper end portion of the tubular member 2 of the tray 1.

Normally, a coiled spring 18, one end of which is connected with the tray 1 and the other end of which is secured to the clamping member 6, tends to force the clamping plate 6 downwardly against the eggs or receptacles 5, as the case may be. Said spring 18 surrounds the tubular member 2 and is interposed between the parts 1 and 6. The degree of movement of the clamping member 6 is shown by the dotted line position in Fig. 1, and in the use of the device hereinbefore described, it will be apparent that the clamping member 6 may be readily raised by means of the finger pieces 9 so as to facilitate the introduction or removal of the articles of food between the parts 1 and 6.

In the operation of placing the articles of food in position, it is frequently desired to hold the clamping member 6 temporarily in an inoperative position, in which condition the catch 11 proves advantageous in that all that it is necessary for the operator to do is to raise the plate 6 by the finger pieces 9 until the hook 13 engages in the opening 10 of the member 8, whereupon the clamping plate will be locked in an upraised position.

To release the clamping plate, the operator has only to raise the catch 11 and the cam portion 15 rides along the lug 17 forcing the hook 13 inwardly and disengaging it from the tubular extension 8 in an obvious manner.

Having thus described the invention, what is claimed as new is:

1. In a culinary device, the combination of a tray adapted to support eggs or similar articles, a tubular member projecting upwardly from said tray, a clamping plate mounted for movement upon said tubular member, and means carried by the tubular member for coöperation with said clamping plate to temporarily hold the latter in an inoperative position with respect to the tray, and a sliding catch mounted in the tubular member and having a hook coöperating with the clamping plate to hold the same temporarily in an inoperative position, said catch having means for disengaging the hook from the clamping plate on sliding movement of the catch.

2. In a culinary device, the combination of a tray adapted to support eggs or receptacles thereon, a tubular member projecting forwardly from the central portion of the tray, a clamping plate above the tray, spring means connecting the clamping plate and tray, a tubular extension projecting from the clamping plate and arranged concentric with respect to the tubular member, a handle at the upper end of the tubular member, a catch slidably mounted in the tubular member and having a hook to engage the tubular extension of the clamping plate, said catch also having a cam portion, and a lug on the tubular member coöperating with the cam portion of the catch to disengage the hook from the tubular extension when the catch is moved slidably in the tubular member.

In testimony whereof I affix my signature in presence of two witnesses.

JOHN S. JOHNSON.

Witnesses:
   PETER JACOBSEN,
   WILLIAM B. SHIPMAN.